United States Patent
Nakamura et al.

(10) Patent No.: US 7,639,913 B2
(45) Date of Patent: Dec. 29, 2009

(54) OPTICAL WAVEGUIDE ELEMENT

(75) Inventors: Shigetoshi Nakamura, Kanagawa (JP); Takashi Kikuchi, Kanagawa (JP); Roshan Thapliya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/190,685

(22) Filed: Aug. 13, 2008

(65) Prior Publication Data

US 2009/0148111 A1 Jun. 11, 2009

(30) Foreign Application Priority Data

Dec. 10, 2007 (JP) .............................. 2007-318484

(51) Int. Cl.
*G02B 6/26* (2006.01)
(52) U.S. Cl. ....................................................... 385/40
(58) Field of Classification Search .................... 385/40
See application file for complete search history.

(56) References Cited

U.S. PATENT DOCUMENTS 5,347,601 A * 9/1994 Ade et al. ....................... 385/3

2004/0086229 A1 * 5/2004 Ahn et al. ....................... 385/40

FOREIGN PATENT DOCUMENTS

| JP | 5-90355 | A | 4/1993 |
| JP | 5090355 | * | 4/1993 |
| JP | 6-120225 | A | 4/1994 |
| JP | 10-260382 | A | 9/1998 |

* cited by examiner

*Primary Examiner*—Uyen-Chau N Le
*Assistant Examiner*—Hoang Tran
(74) *Attorney, Agent, or Firm*—Sughrue Mion, PLLC

(57) ABSTRACT

An optical waveguide element includes: an optical waveguide including an organic non-linear optical material; a first electrode arranged on one surface side of the optical waveguide; a second electrode arranged on another surface side of the optical waveguide; a protective member disposed on the second electrode, the protective member including (i) a third electrode which is provided on a first surface of the protective member, the first surface facing the second electrode, the third electrode being electrically connected to the second electrode, (ii) a fourth electrode which is provided on a second surface of the protective member, the second surface opposing the first surface, and (iii) a conductive portion which penetrates through the protective member from the first surface to the second surface, and electrically connects the third electrode and the fourth electrode.

14 Claims, 6 Drawing Sheets

OPTICAL WAVEGUIDE ELEMENT

CROSS-REFERENCE TO RELATED APPLICATION

This application is based on and claims priority under 35 USC 119 from Japanese Patent Application No. 2007-318484 filed on Dec. 10, 2007.

BACKGROUND OF THE INVENTION

1. Field of the Invention

The present invention relates to an optical waveguide element.

2. Description of the Related Art

Recent years have seen the remarkable development of the information society, and, in particular, the exchange of information including large volumes of data, such as moving images or the like, has increased, not only between businesses but also between individuals. For this reason, high speed communication techniques for large volumes of data have been demanded.

One of the techniques that support high speed communication for large volumes of data is an optical communication technique. Optical waveguide elements such as optical fibers, optical switching elements, optical modulators, and routers and the like are examples of elements used in optical communication.

In recent years, there has been much activity in the development of a waveguide-type optical element (i.e. an optical waveguide element) which controls guided light by an electro-optic (hereinafter, sometimes abbreviated as "EO") effect. Various waveguide structures for the optical waveguide element have been studied, and various methods of forming a waveguide have been disclosed.

Hitherto, as a material of an optical waveguide of an optical waveguide element, inorganic materials such as lithium niobate ($LiNbO_3$) or lead titanate zirconate having lanthanum added thereto (($Pb,La)(Zr,Ti)O_3$, sometimes abbreviated as "PLZT"), which exhibit prominent EO effects, have been widely used. However, when these materials are used, response speed is slow owing to the high dielectric constants of the materials, and therefore, the frequency region to which they may be applied has been limited. In addition, the manufacturing costs are high, due to, for example, a complicated manufacturing process, and the need to perform processing at high temperatures, and thus the application of inorganic materials has been limited.

In contrast, polymers have a lower dielectric constant than inorganic materials, and can significantly overcome problems of velocity mismatching with microwaves; further, the size of a waveguide is not restricted with a polymer, because film formation using a polymer is easily performed by a spin coating method or the like. In addition, since polymers are readily processed using techniques such as micro fabrication and molding processing, they have a significant advantage in that they can be manufactured into elements at an extremely low cost. As a result, polymers have attracted attention for use as an optical waveguide material.

A polymer optical waveguide element including a polymer may be produced by a method including: melting or dissolving polymer materials or polymer precursor compounds each of which forms a lower cladding layer, a waveguide layer, or an upper cladding layer; sequentially applying and curing the polymer materials or polymer precursor compounds on a substrate made of silicon or the like; and cutting or polishing an end surface of the element into a mirror plane. In addition, a waveguide is formed by combining well-known techniques such as lithography and etching. When making a device utilizing a non-linear optical effect such as an electro-optic effect, an electrode is arranged on a substrate or an upper cladding layer. A photocurable adhesive or a thermosetting adhesive is generally used for a cladding material, and a solution in which a polymer compound is dissolved in an organic solvent is generally used for a waveguide layer material.

In an optical waveguide element which controls light by using an EO effect, it is necessary to modulate or switch light input from a light source in accordance with an electric signal, and extract the modulated or switched light to the outside. For this reason, after plural optical waveguide elements are fabricated on a wafer substrate and cut into individual elements, the element is optically connected in such a manner that a fiber for light input is fixed at input and output ends of the waveguide, and, at the same time, the element is fixed to a module casing and is electrically connected, by a method such as wire bonding or flip chip mounting, to a bonding pad which is wired to a control electrode for applying an electric signal.

Hitherto, a control electrode formed on the optical waveguide element has been formed by lift-off or etching after patterning, by using a photomask, of an electrode layer formed on an upper part of an element from the viewpoint of easy processability. In this method, since a bonding pad for electrical connection is also formed on a waveguide thin film, there has been a problem in that the waveguide thin film formed with an organic material is damaged by heat or high frequency waves upon wire bonding, leading to exposure of the substrate.

A method using wire bonding, as well as other methods, are known for electrically connecting an optical waveguide element. However, conventional methods such as this have not addressed problems that accompany electrical connection of an optical waveguide element that includes an organic material. That is, even in a wire bonding device which reduces damage to a substrate with wire bonding, although conventional methods are effective in preventing destruction of an element including a material which is relatively hard and brittle, such as an inorganic optical crystal that includes $LiNbO_3$, they are ineffective when a material which is soft, and easily affected by heat, is used, such as a polymer material. In addition, in a method of flip chip mounting, since it is necessary to melt solder at a high temperature, conventional methods cannot be used in an organic material due to a problem of heat resistance. Further, in a method using a connector, it is impossible to obtain wiring at a high density, and it is also necessary to perform shape processing of an element in order to mount a connector, and this leads to increased costs. In addition, since connection with a connector leads to increase in connection impedance, application to an element which performs high speed optical control is difficult.

As described above, despite expectations regarding the various advantages of optical waveguide elements, due to the problems associated with mounting, application for practical use has been difficult.

SUMMARY OF THE INVENTION

According to an aspect of the invention, there is provided an optical waveguide element comprising:

an optical waveguide including an organic non-linear optical material;

a first electrode arranged on one surface side of the optical waveguide;

a second electrode arranged on another surface side of the optical waveguide;

a protective member disposed on the second electrode, the protective member including (i) a third electrode which is provided on a first surface of the protective member, the first surface facing the second electrode, the third electrode being electrically connected to the second electrode, (ii) a fourth electrode which is provided on a second surface of the protective member, the second surface opposing the first surface, and (iii) a conductive portion which penetrates through the protective member from the first surface to the second surface, and electrically connects the third electrode and the fourth electrode.

BRIEF DESCRIPTION OF THE DRAWINGS

Exemplary embodiments of the present invention will be described in detail based on the following figures, wherein.

DETAILED DESCRIPTION OF THE INVENTION

Figure 1:
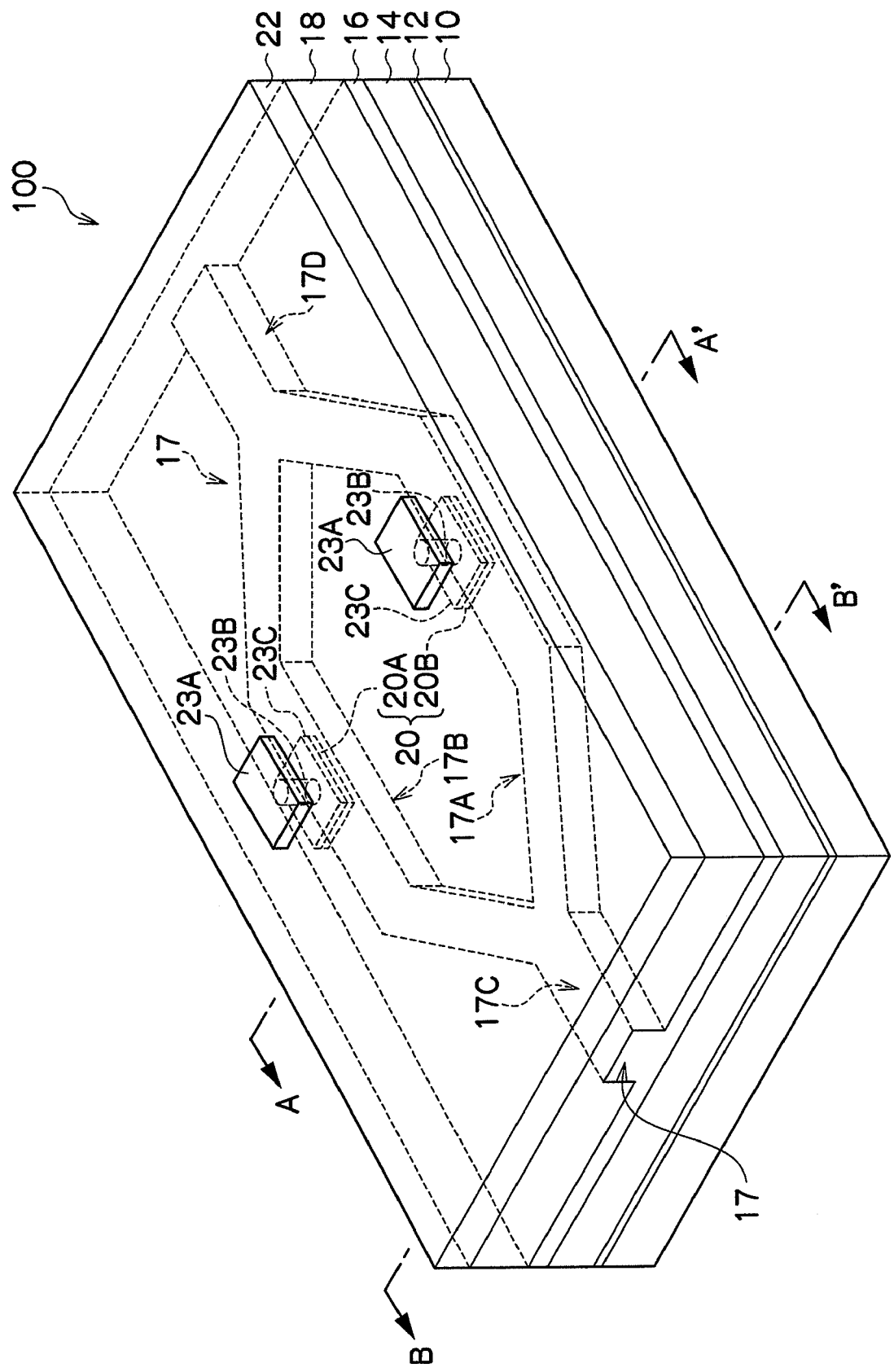
FIG. 1 is a perspective view showing a configuration of an optical waveguide element according to an exemplary embodiment of the present invention.

According to an exemplary embodiment of the present invention, an optical waveguide element which avoids damage to an optical waveguide due to wire bonding is provided.

Hereinafter, exemplary embodiments of the invention will be explained by referring to the drawings.

Figure 2:
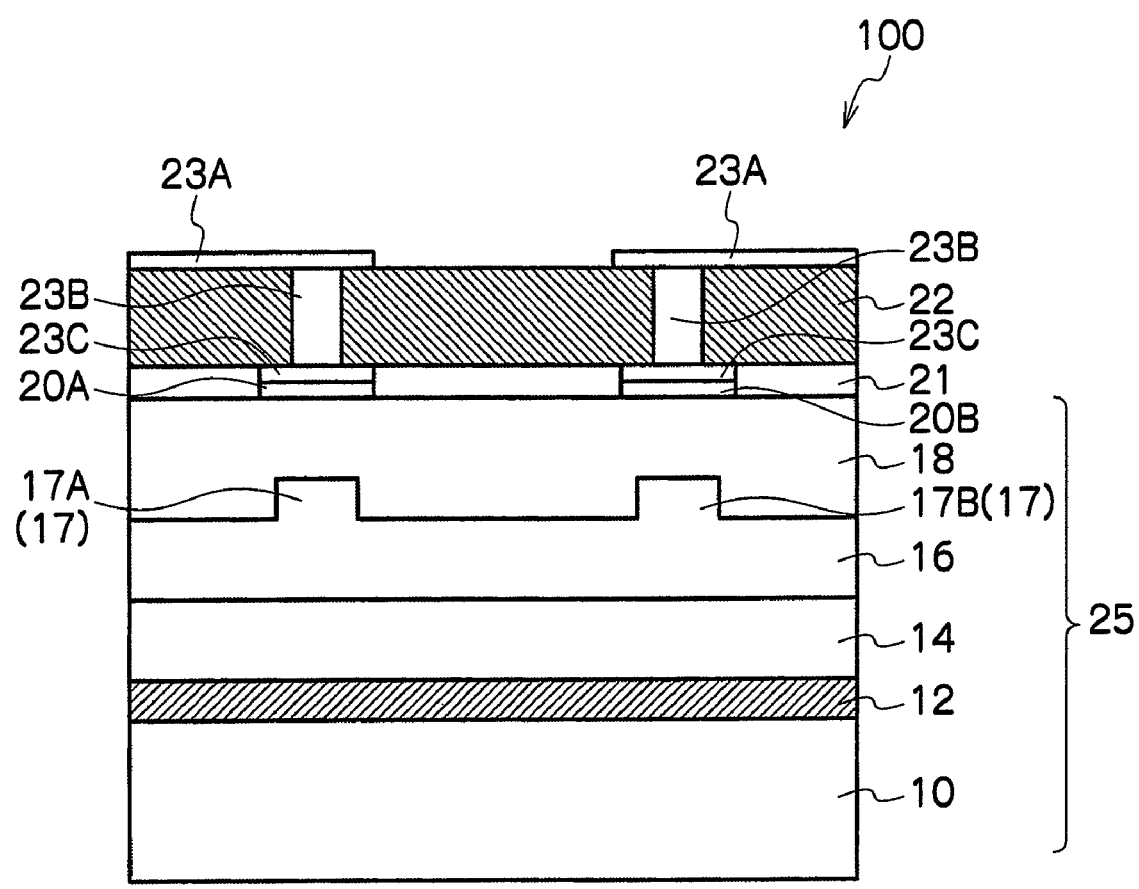
FIG. 2 is an A-A' cross-sectional view of the perspective view shown in FIG. 1 of the optical waveguide element according to an exemplary embodiment of the invention.

As shown FIG. 1 and FIG. 2, an optical waveguide element 100 according to an exemplary embodiment includes, on a substrate 10, a lower electrode 12 (first electrode), a lower cladding layer 14 (first cladding layer), an optical waveguide layer 16 (in which an optical waveguide 17 is formed), an upper cladding layer 18 (second cladding layer), an upper electrode 20 (second electrode), and a protective member 22 in this order. In an exemplary embodiment of the invention, the optical waveguide element 100 includes a Mach-Zehnder interference-optical waveguide and a description will be given to such an optical waveguide element, but the optical waveguide element is not limited thereto.

The substrate 10 will be described. Examples of the substrate 10 include various metal substrates (which are made of aluminum, gold, iron, nickel, chromium, stainless, or the like), various semiconductor substrates (which are made of silicon, silicon oxide, titanium oxide, zinc oxide, gallium-arsenide, or the like), glass substrates, and plastic substrates (which are made of polyethylene terephthalate (PET), poly-carbonate, polyester, polyvinyl chloride, polyvinyl acetate, polymethyl acrylate, polymethyl methacrylate, polyurethane, polyimide, polystyrene, polyamide, or the like). The substrate 10 may be thick and rigid, or may be thin and flexible.

Next, the lower electrode 12 will be described. The lower electrode 12 is formed, for example, on an entire surface of one side surface of the substrate 10. Examples of a material for the lower electrode 12 include various metals such as Au, Ti, TiN, Pt, Ir, Cu, Al, Al—Cu, Al—Si—Cu, W and Mo, various oxides such as tin oxide (NESA), iridium oxide, and tin oxide-iridium oxide composite oxide (ITO), and various organic electroconductive materials such as polythiophene, polyaniline, polyparaphenylenevinylene, and polyacetylene.

The lower electrode 12 may be formed by film growth by a known method such as: a vapor-phase growth method selected from a direct current (DC) magnetron sputtering method, an electron beam deposition method, an electrolytic plating method, a flash deposition method, an ion-plating method, a radio-frequency (RF) magnetron sputtering method, an ion beam sputtering method, a laser abrasion method, a molecular beam epitaxial (MBE) method, a chemical vapor deposition (CVD) method, a plasma CVD method, and a metal organic chemical vapor deposition (MOCVD) method; or a wet process such as a sol gel method or a metal organic decomposition (MOD) method.

When the substrate 10 is a metal substrate, the lower electrode 12 corresponds to the metal substrate. Such a electroconductive substrate or lower electrode 12 is used as an electrode that generates an electric field between the lower electrode 12 and the upper electrode 20, the electric field being applied to an optical waveguide layer 16 (optical waveguide 17) made of an organic non-linear optical material described later. In addition, the upper electrode 20 which is formed on the upper cladding layer 18 may be made of the same material as that for the lower electrode 12.

Next, the lower cladding layer 14 will be described. The lower cladding layer 14 is formed, for example, on an entire surface of one side surface of the lower electrode 12. The lower cladding layer 14 may be made of a material having a refractive index lower than that of the optical waveguide layer 16 disposed on the lower cladding layer 14.

The material used for the lower cladding layer 14 may be a material which does not cause intermixing at formation of the optical waveguide layer 16, and examples thereof include known thermosetting crosslinking resins, known ultraviolet-curable crosslinking resins, known inorganic materials, known electroconductive polymers, and known fluorinated polymers.

Examples of the thermosetting crosslinking resin include polyimide, polyurethane, polybenzocyclobutene, and polyamide. Examples of the ultraviolet-curable crosslinking resin include an epoxy resin, an acrylic resin, and a silicone resin.

As a method of forming the lower cladding layer 14, when a polymer material is used as a material for forming the lower cladding layer 14, a typical solution coating method such as a spin coating method or a dipping method may be used. On the other hand, when an inorganic material is used as a material for forming the lower cladding layer 14, examples of the method for forming the lower cladding layer 14 include, but not limited to, a vapor-phase growth method selected from an electron beam deposition method, a flash deposition method, an ion-plating method, an RF magnetron sputtering method, a DC magnetron sputtering method, an ion beam sputtering method, a laser abrasion method, a MBE method, a CVD method, plasma CVD, and MOCVD, or a wet method such as a sol gel method or a MOD method.

The film thickness of the lower cladding layer 14 varies depending on optical waveguide design specifications such as a wavelength of light which is introduced into the optical waveguide 17 of the optical waveguide element 100. The film thickness may be within a range of 1 μm to 20 μm (or about 1 μm to about 20 μm), and preferably about 1.5 μm to about 10.0 μm.

When a film thickness of the lower cladding layer 14 is more than about 20 μm, an effective voltage applied to the optical waveguide 17 may be low, and sufficient electro-optic (hereinafter, abbreviates as "EO") effect is therefore not obtained. When the film thickness is so thin as to be less than about 1 μm, light absorption by the lower electrode 12 increases and light loss may therefore be large in some cases.

Next, the optical waveguide layer 16 will be described. The optical waveguide layer 16 is formed on a surface of the lower cladding layer 14. The optical waveguide layer 16 may be formed by a material with which an optical waveguide can be formed and which has a higher refractive index than those of the lower cladding layer 14 and the upper cladding layer 18. In an exemplary embodiment of the invention, the material that forms the optical waveguide layer 16 is a polymer which is provided with a non-linear effect (or an organic non-linear material). This organic non-linear material functions as an organic electro-optic material and, the use of this organic non-linear material provides the electro-optic effect to the optical waveguide layer 16.

The organic non-linear material may be an organic non-linear optical polymer in which an organic compound having the non-linear optical property is added to a polymer matrix, or a main chain organic non-linear optical polymer in which a structure having the non-linear optical property (hereinafter, referred to as "chromophore structure" in some cases) is introduced into a main chain of a polymer or a side chain non-linear optical polymer in which a structure having the non-linear optical property (hereinafter, referred to as "chromophore structure" in some cases) is introduced into a side chain of a polymer.

As a material that forms the optical waveguide layer 16, the organic non-linear material by which the optical waveguide 17 can be formed may be used. For example, the organic non-linear material may be a material having a higher refractive index than that of the lower cladding layer 14 may be used. Specifically, the organic non-linear material in which the chromophore structure is introduced into a main chain or a side chain of a polymer for the purpose of imparting the non-linear property to a polymer may be used.

Examples of the polymer material include an acrylic resin, a polyimide resin, an epoxy resin, a polycarbonate resin, polystyrene, polyurethane, polysilane, and polybenzocyclobutene.

The chromophore structure may be selected, without particular restriction, from known structures. For example, a structure represented by the following Structural Formula (I) may be used.

D-P-A  Structural Formula (1)

In Structural Formula (1), D represents an atomic group having an electron donating property, P represents a binding site, and A represents an atomic group having an electron withdrawing property. In Structural Formula (1), the atomic group which has an electron donating property and is represented by "D" may be a known atomic group as far as it has the electron donating property. Examples of the atomic group which has an electron donating property and is represented by "D" include an aliphatic unsaturated bond, an aromatic ring, and a heteroaromatic ring, each having an electron donating substituent, and a combination thereof The electron donating substituent is not particularly limited as far as it has the electron donating property, and examples thereof include an alkyl group, an alkoxy group, and an amino group. A part of the alkyl group may be substituted by an alkoxy group or a phenyl group, a part of the alkoxy group may be substituted by an alkoxy group or a phenyl group, and a part of the amino group may be substituted by an alkyl group, an alkoxy group, or a phenyl group.

On the other hand, the atomic group which has an electron withdrawing property and is represented by "A" may be any known atomic group as far as it has the electron withdrawing property, and examples of the atomic group which has an electron withdrawing property and is represented by "A" include structures such as an aliphatic unsaturated bond, an aromatic ring, and a heteroaromatic ring, in each of which an electron withdrawing substituent is introduced, and a combination thereof.

Examples of the electron withdrawing substituent include a halogen atom, an alkyl group substituted by a halogen, a cyano group, a nitro group, and a carbonyl group.

A binding site represented by "P" may be any binding site as far as it links "D" and "A" via a covalent bond, and have a conjugated bond in which electron may be delocalized. For example, the binding site may be a site having a structure that binds "D" and "A" via a π conjugated system. Specific examples of the binding site include aliphatic unsaturated bonds, aromatic rings, and heteroaromatic rings, and combinations thereof in which at least two of them are bond to each other.

The optical waveguide 16 may be formed by dissolving a polymer material having the chromophore structure, or a mixture of an organic compound having the chromophore structure and a polymer material in a solvent to prepare a coating solution, and applying the coating solution onto a surface of the lower cladding layer 14 or the like.

Examples of a method of providing the optical waveguide layer 16 by coating include known methods such as spin coating, spray coating, blade coating, and dip coating. The solvent may be removed by heating and drying with a ventilation drier, or by drying with a reduced pressure (vacuum) drier.

The thickness of the optical waveguide layer 16 is preferably small so that the electric field formed between the lower electrode 12 and the upper electrode 20 effectively acts on the optical waveguide (which may be hereinafter referred to as an active site) located between the lower electrode 12 and the upper electrode 20. The thickness of the optical waveguide 16 may be 5.0 μm or less (or about 5.0 μm or less), and preferably 3.5 μm or less (or about 3.5 μm or less).

When the thickness of the optical waveguide layer 16 is more than 5.0 μm, a high voltage needs to be applied to the active site in the optical waveguide 17 in order to generate a desired phase change in light transmitted at the active site, and thus it may be difficult to attain a low driving voltage. On the other hand, a lower limit of the film thickness of the optical waveguide layer 16 may be 1.0 μm (or about 1.0 μm).

Regarding the optical waveguide 17 formed in the optical waveguide layer 16, when the optical waveguide 17 is formed, for example, into a ridge (i.e. a shape in which the optical waveguide 17 projects toward an upper cladding layer 18 side) as shown in FIG. 1 and FIG. 2, the ridge-shaped optical waveguide 17 may be formed by forming a ridge by dry etching.

In an exemplary embodiment of the invention, the optical waveguide 17 formed in the optical waveguide layer 16 is a Mach-Zehnder optical waveguide as shown in FIG. 1 and FIG. 2, and this optical waveguide will be described below.

In the Mach-Zehnder optical waveguide 17, an incident optical waveguide portion 17C into which light is introduced, and an outgoing optical waveguide portion 17D from which the introduced light exits, are formed as one optical path, and the optical path is branched into two portions, that is, an incident optical waveguide portion 17A (hereinafter, referred to as an arm portion 17A in some cases), and an incident optical waveguide portion 17B (hereinafter, referred to as an arm portion 17B in some cases), which are located between the incident optical waveguide portion 17C and the outgoing optical waveguide portion 17D. Accordingly, light that is introduced into the incident waveguide portion 17A is divided into two beams, and the beams respectively enter two separated optical paths (i.e., the arm portion 17A and the arm portion 17B). After that, the two beams are respectively transmitted in the arm portion 17A or the arm portion 17B, and are combined into one light beam at the outgoing optical waveguide portion 17D, and the light beam then exits the optical waveguide 17.

The width and height of the ridge that constitutes the optical waveguide 17 (i.e., the width and height of the optical waveguide 17) may vary depending on a combination of the refractive index of the optical waveguide 17 and the thickness of the optical waveguide layer 16. The ridge height (bump height) may be in a range of from 50 nm to 3,000 nm (or about 50 nm to about 3,000 nm), and preferably from 500 nm to 2000 nm (or about 500 nm to about 2000 nm). When the ridge height is less than 50 nm, a sufficient difference in refractive index may not be obtained between the optical waveguide 17 and the upper cladding layer 18, and between the optical waveguide 17 and the lower cladding layer 14, and therefore light may not be confined within the optical waveguide 17.

On the other hand, if the ridge height exceeds 3,000 nm, the mode becomes a multimode, and the function of the desired element may not be sufficiently expressed. The ridge width may be in a range of from 1 μm to 15 μm (or about 1 μm to about 15 μm), and preferably from 3 μm to 10 μm (or about 3 μm to about 10 μm).

When the optical waveguide 17 has the ridge-shaped structure, the difference in refractive index between the upper cladding layer 18 and the lower cladding layer 17 may be larger. In addition, absorption loss due to an electrode may be suppressed, and an effective electric field of the element may be strengthened, leading to a decrease in driving voltage.

Next, the upper cladding layer 18 will be described. The upper cladding layer 18 is formed, for example, on an entire surface of one side surface of the optical waveguide layer 16. After the optical waveguide 17 is formed by forming the ridge in the optical waveguide layer 16, the upper cladding layer 18 may be formed by, covering the optical waveguide layer 16 with a material having a lower refractive index than that of the optical waveguide layer 16.

The material to be used for the upper cladding layer 18 may be a material which does not cause intermixing with the optical waveguide layer 16 at formation of the upper cladding layer 18, and examples of the material to be used for the upper cladding layer 18 include the materials used for the lower cladding layer 14 as described above. In addition, the upper cladding layer 18 may be formed by any of the aforementioned methods usable in the formation of the lower cladding layer 14. The thickness of the upper cladding layer 18 is in a range of preferably 1 μm to 20 μm, more preferably 1.5 μm to 10.0 μm.

In the optical waveguide element 100, the refractive index of the upper cladding layer 18 and the refractive index of the lower cladding layer 14 are generally smaller than the refractive index of the optical waveguide layer 16. In an exemplary embodiment of the invention, the difference in refractive index between the optical waveguide layer 16 and the upper cladding layer 18 or between the optical waveguide layer 16 and the lower cladding layer 14 depends on the application of the optical waveguide element 100. For example, when the optical waveguide element is a single mode optical waveguide, the difference is preferably in a range of 0.01% to 10%.

Next, the upper electrode 20 will be described. The upper electrode 20 is formed on a surface of the upper cladding layer 18. The upper electrode 20 is provided, for example, at such a position that, when an electric field is formed between the upper electrode 20 and the lower electrode 12, the phase of light that is transmitted through a region of the optical waveguide 17 located in the formed electric field is changed and, at the same time, the intensity of the light introduced into the optical waveguide 17 is modulated and light having the modulated intensity leaves the optical waveguide 17. In an exemplary embodiment of the invention, the upper electrode 20 includes a pair of electrodes.

Specifically, when the optical waveguide 17 is of a Mach-Zehnder-type as shown in FIG. 1 and FIG. 2, upper electrodes that constitute an electrode pair of the upper electrode 20 are formed in such a manner that a pair of electrodes, upper electrode 20A and upper electrode 20B, are provided in a region or regions corresponding to at least one of the arm portion 17A or the arm portion 17B of the optical waveguide 17.

That is, the electrode pair that constitutes the upper electrode 20 is provided in such a region that light introduced into the optical waveguide 17 can be modulated and exit, as a result of application of a voltage between the electrode pair of the upper electrode 20 and the lower electrode 12.

In the exemplary embodiment shown in FIG. 1 and FIG. 2, an upper electrode 20A and an upper electrode 20B constitute the electrode pair. The upper electrode 20A is provided at such a position that the electric field can be formed at the arm portion 17A of the optical waveguide 17 when a voltage is applied between the upper electrode 20A and the lower electrode 12. The upper electrode 20B is provided at such a position that the electric field can be formed at the arm portion 17B of the optical waveguide 17 when a voltage is applied between the upper electrode 20B and the lower electrode 12.

In an exemplary embodiment of the invention, description has been made so far regarding a case in which the upper electrode 20A and the upper electrode 20B that form an electrode pair of the upper electrode 20 are provided at a position corresponding to the arm portion 17A of the optical waveguide 17 and a position corresponding to the arm portion 17B of the optical waveguide 17, respectively. However, the invention is not limited to such an embodiment, and the electrodes may be provided at other positions as long as the light intensity of the light that is introduced into the optical waveguide 17 is modulated by application of a voltage between the upper electrode 20 and the corresponding lower electrode 12, and the light having the modulated light intensity exits from the optical waveguide 17.

For example, a configuration may be used in which both of the upper electrode 20A and the upper electrode 20B are provided at a position corresponding to one of the arm portion 17A or the arm portion 17B of the optical waveguide 17.

In addition, in the exemplary embodiment of the invention, a case in which the upper electrode 20 is formed of a pair of electrodes is described for simplification of description.

However, a configuration in which the upper electrode includes plural pairs of electrodes may be also used.

The upper electrode 20 may be formed by film growth by a known method, for example, a vapor-phase growth method selected from a DC magnetron sputtering method, an electron bean deposition method, an electrolytic plating method, a flash deposition method, an ion-plating method, an RF magnetron sputtering method, an ion beam sputtering method, a laser abrasion method, a MBE method, a CVD method, a plasma CVD method, and a MOCVD method, or a wet process such as a sol gel method or a MOD method.

Next, a protective member 22 will be described. The protective member 22 may be disposed on the upper cladding layer 18 with the upper electrode 20 interposed therebetween. That is, the protective member 22 may be formed on an entire surface of one side surface of the upper cladding layer 18 so as to cover the upper electrode 20. However, the protective member 22 may not be formed on the entire surface of the upper cladding layer 18 as far as it is formed so as to cover the upper electrode 20.

In this protective member 22, a wiring electrode 23C (corresponding to a third electrode), a wiring electrode 23A (corresponding to a fourth electrode), and a conductive portion 23B are provided. The conducting portion 23B is provided so as to penetrate through the protective member 22 in a thickness direction, and conducts electricity in the thickness direction. The wiring electrode 23C is provided on the lower surface side of the protective member 22, and the wiring electrode 23A is provided on the upper surface side of the protective member 22. That is, the conducting portion 23B electrically connects the wiring electrode 23C and the wiring electrode 23A in a thickness direction of the protective member 22.

In the exemplary embodiment of the invention, when the protective member 22 is disposed on the upper cladding layer 18 with the upper electrode 20 disposed therebetween, the lower surface side of the protective member 22 indicates a surface of the protective member 22 that faces the upper electrode 20. In addition, in the exemplary embodiment of the invention, when the protective member 22 is disposed on the upper cladding layer 18 with the upper electrode 20 interposed therebetween, the upper surface side of the protective member 22 indicates a surface of the protective member 22 that opposes the upper electrode 20.

The wiring electrode 23C is provided prior to the formation of the protective member 22 at such a position that it is electrically connected with the upper electrode 20 when the protective member 22 is disposed on the upper electrode 20 to form the optical waveguide element 100. For this reason, the wiring electrode 23C may be provided so as to contact with an entire region of a surface of the upper electrode 20 which faces the wiring electrode 23C, as shown in FIG. 2, or may be provided so as to contact with a part of a region of a surface of the upper electrode 20 which faces the wiring electrode 23C, as shown in the optical waveguide element 100 of FIG. 4. The wiring electrode 23A and the conducting portion 23B may be electrically connected to the upper electrode 20 via the wiring electrode 23C when they are included in the optical waveguide element 100, and the respective positions of the upper electrode 20 and the wiring electrode 23C, as well as the respective positions of the wiring electrode 23C and the wiring electrode 23A, may be offset in the main plane of the protective member 22, as shown in FIG. 4.

Figure 3A:
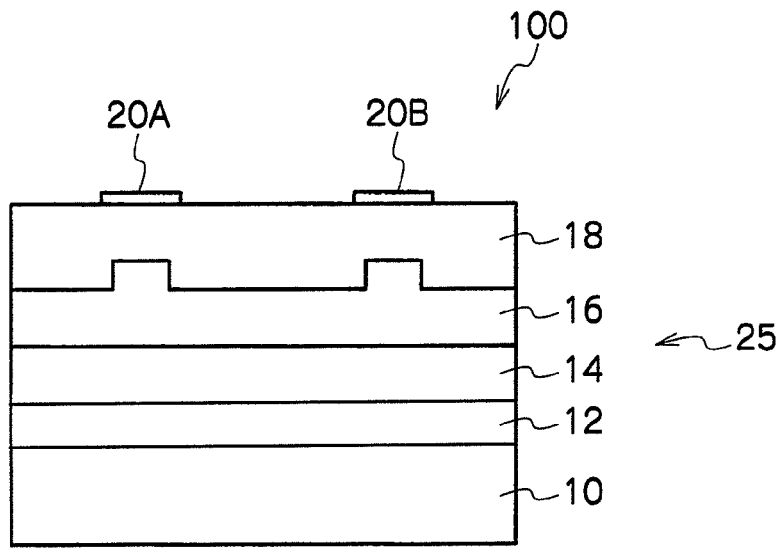
FIG. 3A to FIG. 3C are schematic views showing a process for manufacturing the optical waveguide according to an exemplary embodiment of the invention.
Figure 3B:
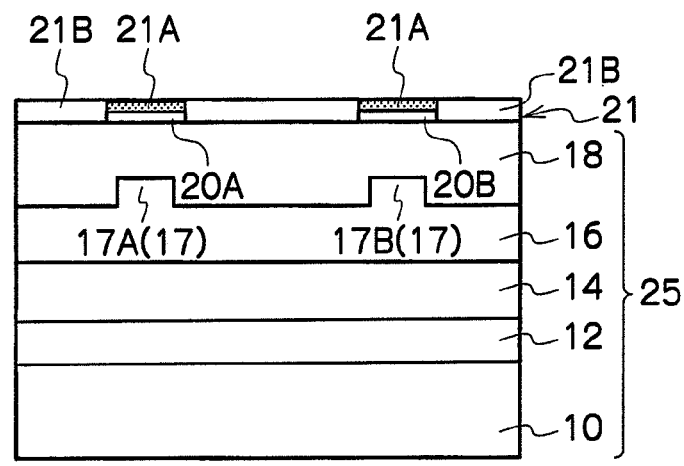
Figure 3C:
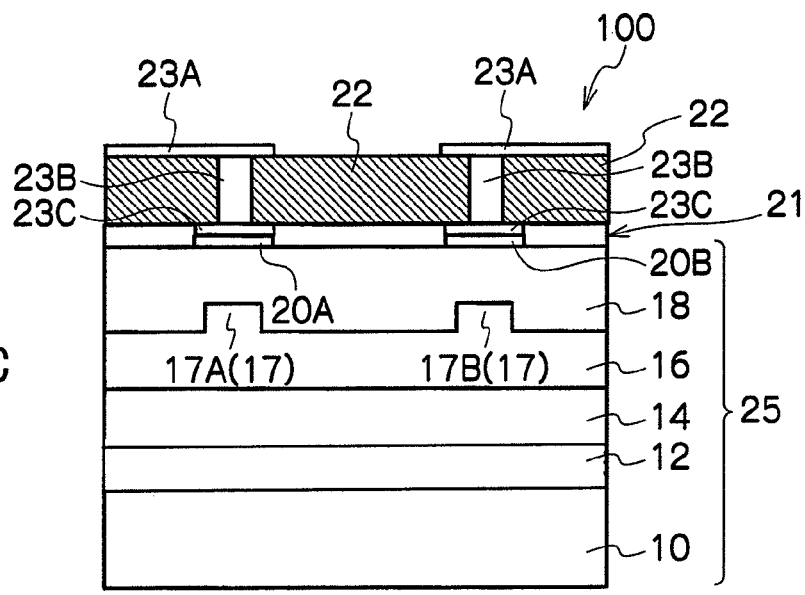
Figure 4:
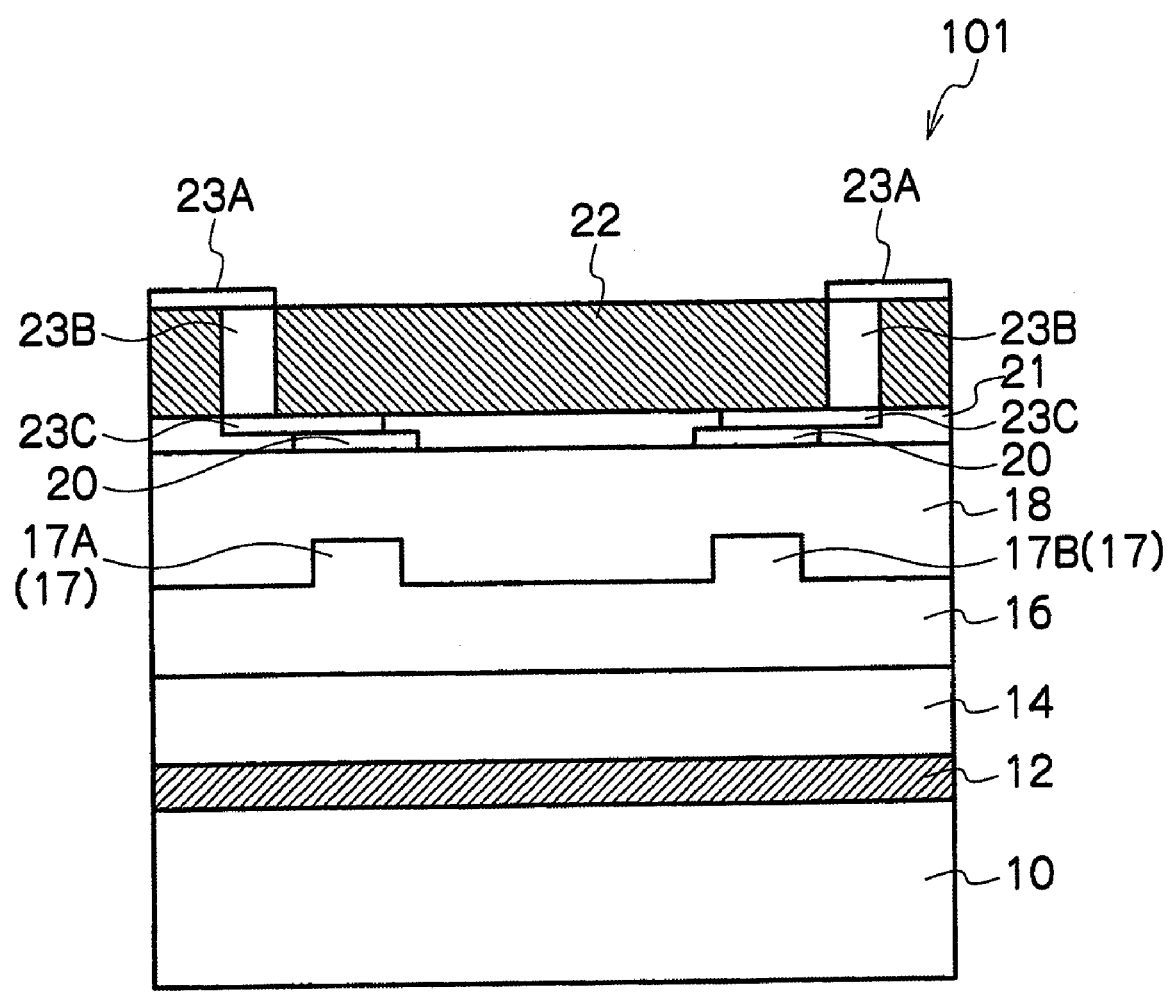
FIG. 4 is an A-A' cross-sectional view of the perspective view shown in FIG. 1 of the optical waveguide element according to an exemplary embodiment of the invention, the cross-sectional view showing an exemplary embodiment different from that of FIG. 2.

Since the optical waveguide element 101 shown in FIG. 4 has the same configuration as that of the optical waveguide element 100 except that the wiring electrode 23C, the conductive portion 23B, and the wiring electrode 23A in the protective member 22 are provided at different positions from those of the optical waveguide element 100 shown in FIG. 1 to FIG. 3C, detailed explanation is omitted.

The wiring electrode 23A is used for connecting a terminal of a voltage applying device that applies a voltage at a poling treatment or driving of an element. From the viewpoint of suppression of discharge and electrostatic breakdown, the thickness of the protective member 22 is, for example, 20 μm to 100 μm.

The material for the protective member 22 may be an insulating material, and the plastic films and inorganic materials which are generally known may be used. Examples of the plastic film include those made of PET (polyethylene terephthalate), polymethyl methacrylate, PEN (polyethylene naphthalate), and polyimide. Examples of the inorganic materials include glass and ceramic.

In an exemplary embodiment of the invention, the optical waveguide element 100 is formed by disposing a lower electrode 12, a lower cladding layer 14, and optical waveguide layer 16, an upper cladding layer 18, and an upper electrode 20 in layers on a substrate 10 by the method as described above to form an optical waveguide portion 25, and then by disposing, on the optical waveguide portion 25, a protective member 22 via an adhesive layer 21.

Specifically, as shown in FIG. 3A, after the lower electrode 12 and the lower cladding layer 14 are formed on the substrate 10, a solution of a waveguide layer material is applied onto the lower cladding layer 14 to form a film of the optical waveguide layer 16. Then, the optical waveguide layer 16 is processed by dry etching or the like to form a ridge-shaped optical waveguide layer 17 having a ridge portion. Further, the upper cladding layer 18 is formed on the optical waveguide layer 16. The upper electrode 20 (including upper electrodes 20A and 20B) is formed at a position over the optical waveguide 17 (i.e. ridge portion) of the optical waveguide layer 16 on the upper cladding layer 18, to thereby produce the optical waveguide portion 25.

Then, as shown in FIG. 3B, an electroconductive adhesive layer 21A including an electroconductive adhesive such as an electroconductive paste is provided on the upper electrode 20 of the optical waveguide portion 25, and an insulating adhesive layer 21B including an insulating adhesive such as an insulating paste is provided on the upper cladding layer 18 of the optical waveguide portion 25, thereby providing an adhesive layer 21.

Further, as shown in FIG. 3C, a protective member 22 may be disposed on the adhesive layer 21, thereby producing an optical waveguide element 100.

When the protective member 22 is provided, the position of the wiring electrode 23C of the protective member 22 may be adjusted in advance so that the wiring electrode 23C of the protective member 22 is electrically connected to the upper electrode 20 of the optical waveguide portion 25.

The optical waveguide element may be manufactured by the processes described above. In general, plural optical waveguide elements are manufactured by the processes on a wafer (or substrate), and are further processed by cutting into chips (i.e. individual elements) to obtain an element. A dicer or the like may be used for the cutting. The individual element may be rectangular, or may have a diamond-like and trapezoid-like shape for the purpose of reducing light returning at a light outputting and inputting end face.

When the optical waveguide element 100 manufactured by the processes is fixed in a module casing (not shown) and the protective member 22 is not provided, it is necessary to directly connect the upper electrode 20 of the optical waveguide element 100, and a pad (not shown) of the module casing by wire bonding. However, when the pad and the upper electrode 20 are directly connected by wire bonding, the optical waveguide 17 may be damaged by the heat or high frequency current applied in wire bonding in some cases.

On the other hand, in an exemplary embodiment of the invention, the optical waveguide 100 has the upper electrode 20, and thereon, the protective member 22 including the wiring electrode 23C, the wiring electrode 23A, and the conductive portion 23B which electrically connects the wiring electrode 23C and the wiring electrode 23A in a thickness direction of the protective member 22. For this reason, wire connection by wire bonding is not performed directly on the upper electrode 20, but may be performed on the wiring electrode 23A via the wiring electrode 23C and the conductive portion 23B which are electrically connected with the upper electrode 20, since conductive portion 23B is electrically connected to wiring electrode 23A. That is, in an exemplary embodiment of the invention, the optical waveguide element 100 is fixed to the module casing by connecting the wiring electrode 23A and the pad (not shown) of the module casing by wire bonding.

According to the optical waveguide element 100 of an exemplary embodiment of the invention, unlike the case where the upper electrode and the pad (not shown) of the module casing are directly connected by wire bonding, the optical waveguide 100 is fixed in the module casing by connecting the wiring electrode 23A provided on the protective member 22, and the pad (not shown) of the module casing by wire bonding.

For wire bonding, a general-use device which is used for electric mounting of a semiconductor IC may be used.

Herein, in order to make the optical waveguide 17 of the optical waveguide element 100 exert the non-linear optical effect (e.g. electro-optic effect), it is necessary that orientations of molecules thereof may be uniformized by poling treatment.

This poling treatment refers to a treatment of orienting the molecules in a polarization direction of the organic non-linear material that is included in the optical waveguide 17 and the optical waveguide layer 16, or in a polarization direction of a chromophore portion of the organic non-linear material having the chromophore by orientation treatment. The orientation treatment include applying the electric field after film making, in the state where heated at a glass transition temperature (Tg) or a higher temperature and, while maintaining the orientation, removing the electric field after lowering a temperature to Tg or lower.

In the poling treatment, as a method of applying the electric filed, a method is performed in which the optical waveguide 17 including the organic non-linear material is directly sandwiched between two or more electrodes, and then the electric field is applied thereto (i.e. electrode poling). Specifically, the lower electrode 12 is grounded and, at the same time, a terminal of a voltage applying unit is electrically connected to the wiring electrode 23A of the protective member 22. A certain voltage is applied to the wiring electrode 23A by the voltage applying unit, to apply an electric field between the upper electrode 20 and the lower electrode 12 via the wiring electrode 23A, thereby applying a poling treatment to the optical waveguide 17 including the organic non-linear material.

A poling temperature may be a glass transition temperature or higher. Specifically, the material may be kept within a range of from 100° C. to 200° C. for about 0.2 hour to about 10 hours. When the poling temperature is increased stepwise from room temperature to a final temperature, a temperature increment between respective steps may be within a range of from about 5° C. to about 50° C., and a time period at each step is from about 10 minutes to about 120 minutes. The temperature increment between the steps and the time periods in the respective steps may be the same or different throughout the poling treatment. The rate of temperature increase when the temperature is continuously increased may be from about 0.1° C./min to about 20° C./min. The continuous temperature increase may be combined with the step of increasing the temperature stepwise.

The voltage applied at a poling treatment may be constant, or may be changed continuously or stepwise, and may or may not be coincide with the timing of temperature increase or decrease. For example, the voltage applied to the upper electrode 20 may be within a range of from about 0.1 kV to about 2 kV. The polarity of the electrode may be positive or negative.

For the poling treatment, a direct electric field may be applied to a sample (i.e. organic non-linear material), which is in a softened state or in a fluidized state, by using an electrode. The sample may be solidified by cooling or by thermal curing of a polymer, and any of them may be performed under application of an electric field. This process may be conducted at any time after formation of the optical waveguide. Since the non-linear optical effect may be deteriorated when heating is performed at a later step, the polarization orientation treatment is preferably performed after a process including the heat treatment.

The thus-formed optical waveguide element 100 may be used as an optical modulation element which modulates light, or as a light modulation switch which switches light.

Next, function of the thus-formed optical waveguide will be described.

Light introduced from the incident optical waveguide portion 17C of the optical waveguide 17 is branched into two beams, and they are transmitted in the arm portion 17A and the arm portion 17B, respectively, and unite at the meeting region of the arm portions. Then, the light is transmitted in the outgoing optical waveguide portion 17D, and exits from the optical waveguide 17.

In the optical waveguide element 100, when a voltage is not applied between the upper electrode 20 and the lower electrode 12 from a voltage applying portion (not shown), light which has been introduced into the incident optical waveguide 17C is branched into two light portions, and they are transmitted in the arm portion 17A and the arm portion 17B and are converged into single mode light while they interfere with each other at a joining part between these arm portions (i.e. joining part of the arm portions with outgoing optical waveguide portion 17D). At this time, since the electric field is not formed in the arm portion 17A and the arm portion 17B, a phase difference is not generated between the beams respectively transmitting in these arm portions. Therefore, light having the same intensity as that of the light introduced into the incident optical waveguide portion 17C exits from the outgoing optical waveguide portion 17D.

As described above, since the optical waveguide 17 includes a material having the electro-optic effect, when the electric field is formed in the optical waveguide 17 by applying a voltage between the upper electrode 20 and the lower electrode 12 via the wiring electrode 23A, the conductive portion 23B, and the wiring electrode 23C, a refractive index of the light that is transmitted in a region within the optical waveguide 17 where the electric field is formed is changed to change a phase. For this reason, when the electric field is formed between the lower electrode 12 and the upper electrode 20 by applying a voltage from a voltage applying portion (not shown) to the lower electrode 12 and the upper electrode 20 via the wiring electrode 23A, the conductive portion 23B, and the wiring electrode 23C, the refractive index of the light that is transmitted in a region corresponding to an area where the electric field is formed, within the optical waveguide 17, is changed depending of the voltage value of the applied voltage, and light having a different intensity from that of the light introduced into the optical waveguide 17 exits from the optical waveguide 17.

More specifically, when a voltage is applied between the upper electrode 20 and the lower electrode 12 from the voltage applying portion (not shown), light which has been introduced into the incident optical waveguide portion 17C is branched into two beams, and they are transmitted in the arm portion 17A and the arm portion 17B, respectively, and are converged into one while they interfere with each other at a joining part between these arm portions (i.e. joining part between the arm portions and the outgoing optical waveguide portion 17D). At this time, since electric fields are formed in the arm portion 17A and the arm portion 17B, a phase difference depending on the electric fields is generated between the beams that are respectively transmitted in these arm portions, and light having a different intensity from that of the light introduced into the incident optical waveguide portion 17C exits from the outgoing optical waveguide portion 17D. That is, when a voltage is applied between the upper electrode 20 and the lower electrode 12 from the voltage applying portion (not shown), the intensity of light is continuously modulated according to the applied voltage.

In the optical waveguide element 100 according to an exemplary embodiment of the present invention, the upper electrode 20 is covered with the protective member 22. A terminal of a voltage applying device is electrically connected to the wiring electrode 23A provided on this protective member 22, and a poling treatment is performed by applying a voltage to the upper electrode 20 via the wiring electrode 23A. Upon the poling treatment, since the upper electrode 20 is covered with the protective member 22, the poling treatment may be realized by application of a higher voltage as compared with the case where the upper electrode 20 is not covered with the protective member 22, while discharge of an electrode, electrostatic breakage, or the like caused by the application of a voltage may be suppressed. As the result, the orientation degree of the organic non-linear optical material is improved, and the organic non-linear optical material exerts higher electro-optic effects.

Figure 5A:
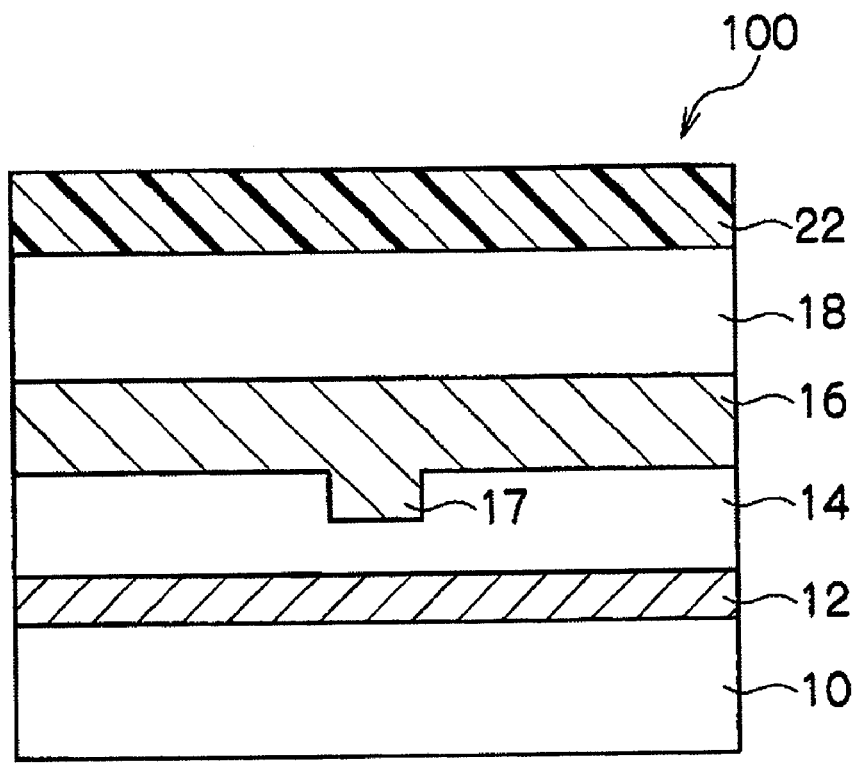
FIG. 5A and FIG. 5B are schematic views each corresponding to a B-B' cross-sectional view of the perspective view shown in FIG. 1 of the optical waveguide element according to an exemplary embodiment of the invention.

Although the optical waveguide 17 has a ridge shape in the exemplary embodiment of the invention, a reverse ridge-shaped optical waveguide may be used in which the optical waveguide 17 projects towards a lower cladding layer 14 (or lower electrode 12) side, as shown in FIG. 5A.

The reverse ridge-shaped optical waveguide 17 may be formed by patterning, in advance, the lower cladding layer 14 by a known method using a semiconductor processing technique such as reactive ion etching (RIE), wet etching, photolithography, or electron beam lithography, processing the lower cladding layer 14 to form a trench, and forming the optical waveguide layer 16 thereon.

When the optical waveguide 17 takes a reverse ridge-shaped structure, it becomes possible to increase the difference in refractive index between the upper cladding layer 18 and the lower cladding layer 14. Therefore, since it becomes possible to suppress absorption loss due to the electrode, and strengthen an effective electric filed of the element, the driving voltage can be reduced.

Figure 5B:
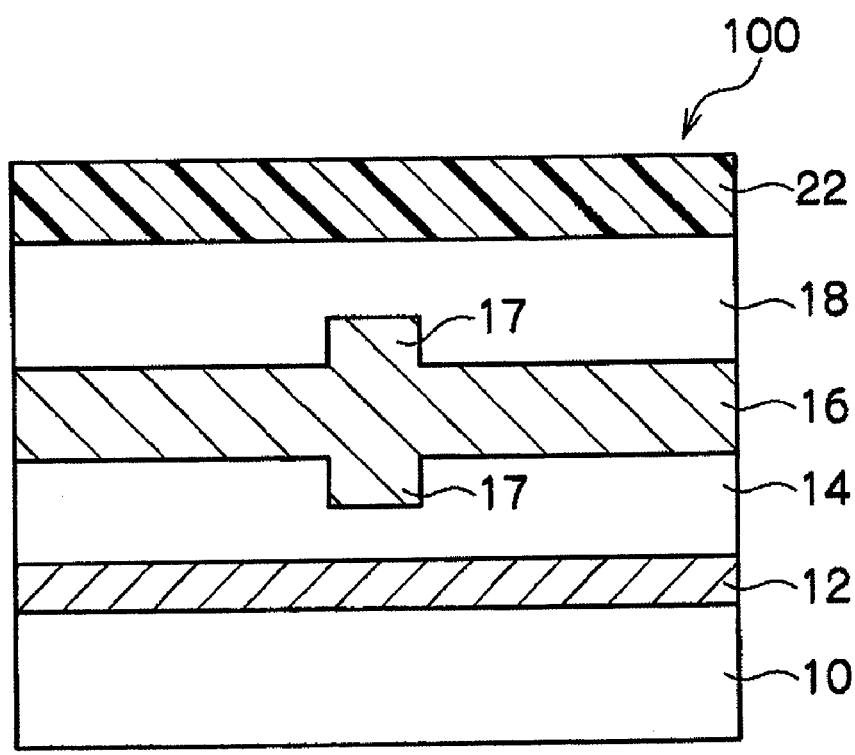

In addition, although the optical waveguide 17 has a ridge shape in the exemplary embodiment of the invention, a normal reverse ridge optical waveguide may be used in which the optical waveguide 17 projects towards both of the upper cladding layer 18 (upper electrode 20) side and the lower cladding layer 14 (lower electrode 12) side, as shown in FIG. 5B.

The normal reverse ridge-shaped optical waveguide 17 may be formed by combining the methods of forming the ridge shape optical waveguide and the reverse ridge-shaped optical waveguide.

When the optical waveguide 17 has a normal reverse ridge shape, it becomes possible to increase the difference in refractive index between the upper cladding layer 18 and the lower cladding layer 14 as compared with the ridge-shaped optical waveguide and the reverse ridge-shaped optical waveguide. Therefore, since it becomes possible to suppress absorption loss due to the electrode, and strengthen an effective electric field of the element, the driving voltage may be reduced.

Although an exemplary embodiment of the invention has been described with respect to a case in which the optical waveguide 17 to be formed in the optical waveguide layer 16 is of a Mach-Zehnder type, the shape of the optical waveguide 17 is not limited to such a shape (i.e. not limited to the Mach-Zehnder type). Examples of other possible shapes include an "X" shape in which the optical waveguide 17 is crossed to substantially resemble the letter "X", a multimode interference type having a shape such that the optical waveguide 17 is widened in a transverse direction to enable multimode transmission (see FIG. 6), and an optical waveguide pattern including of a combination of shapes.

Figure 6:
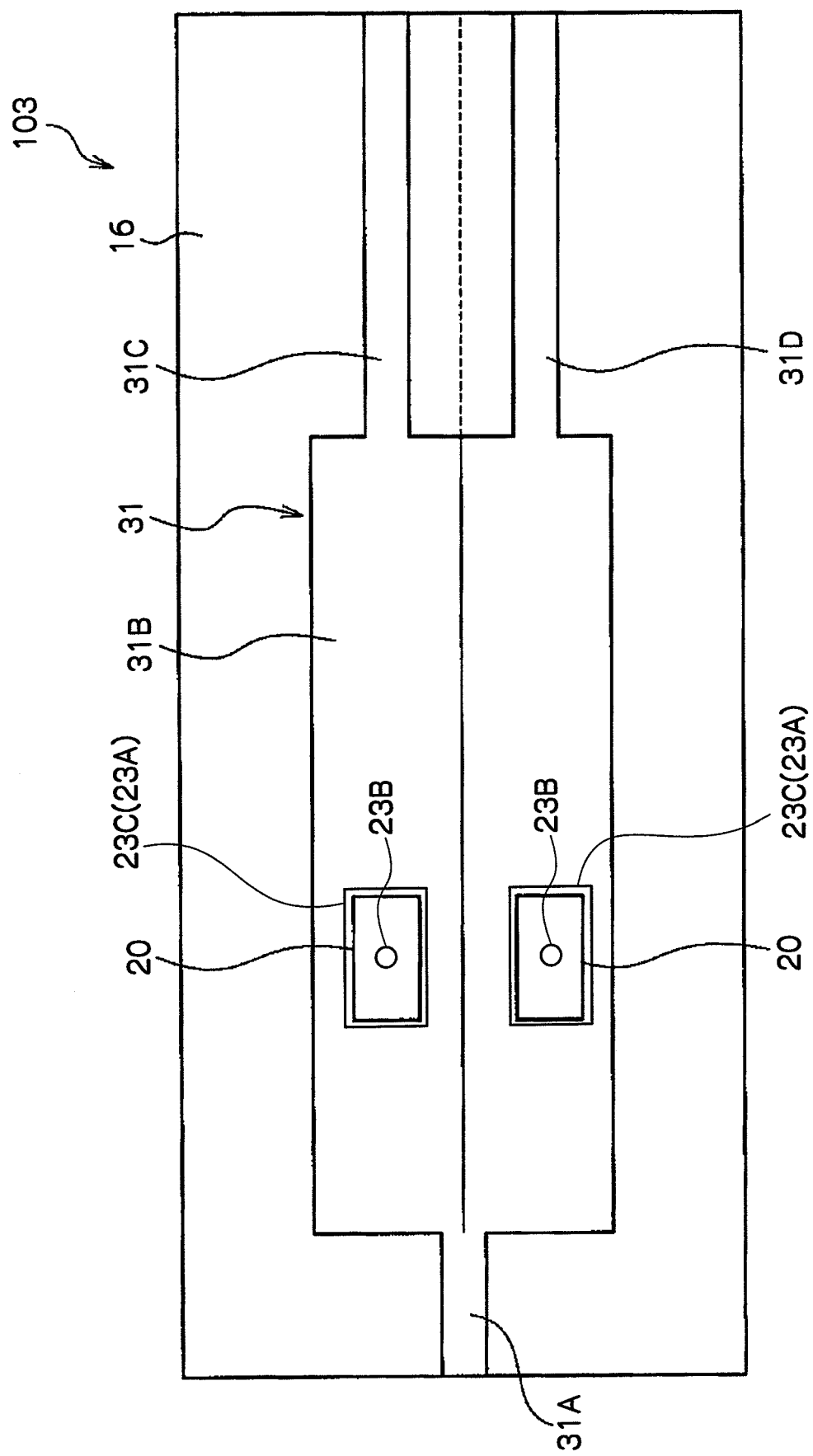
FIG. 6 is a schematic view showing a different exemplary embodiment from that shown in FIG. 1 of the optical waveguide element according to an exemplary embodiment of the invention.

For example, when the optical waveguide 17 is configured for multimode interference, as shown in FIG. 6, an optical waveguide element 103 may include an optical waveguide 31 which is formed in the optical waveguide layer 16 and which includes an incident optical waveguide portion 31A, a multimode interference optical waveguide 31B, an outgoing optical waveguide portion 31C, and an outgoing optical waveguide portion 31D.

The pair of electrodes, each of which serves as the upper electrode 20, may be provided at positions such that when the electric field is formed between the upper electrode and the lower electrode, the phase of the light that is transmitted in a region of the optical waveguide 31 located within the formed electric field is changed, and, at the same time, light having a different intensity from that of the light introduced into the optical waveguide 31 leaves the waveguide.

For example, as shown in FIG. 6, an optical waveguide may be configured such that one of the pair of upper electrodes (upper electrode 20) and the other of the pair of electrodes (upper electrode 20) are respectively provided in the multimode interference waveguide 31B at respective sides of a central line which runs in a direction that intersects a direction of light transmitted from the incident optical waveguide portion 31A towards the outgoing optical waveguide portion 31C and the outgoing optical waveguide portion 31D.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

EXAMPLES

Hereinafter, the present invention will be described more specifically by referring to Examples. However, it is needless to say that the invention is not limited to the following Examples.

Example 1

First, a solution including 77 parts by mass of cyclohexanone, 9 parts by mass of tetrahydrofuran, 10 parts by mass of polysulfone, and 4 parts by mass of Disperse Red 1 (trade name, manufactured by Tokyo Chemical Industry Co., Ltd.; hereinafter, may be referred to as DR1), assuming that the total mass of all of these materials (hereinafter, referred to as PS solution) is 100 parts by mass, is prepared as a solution of a non-linear optical material. The refractive index of a film formed from the material is measured by a prism coupling method and is confirmed to be 1.63.

Then, an Au layer having a thickness of 500 nm as a lower electrode is provided on a surface of a silicon substrate (diameter: 50.8 mm, thickness: 0.5 mm) by a sputtering method.

Then, an ultraviolet curable acrylic resin having a refractive index of 1.54 is applied as a lower cladding layer onto a lower electrode surface, and is irradiated with an ultraviolet ray, to form a cured resin film having a thickness of 3.5 µm.

Subsequently, the prepared solution of the non-linear optical material (i.e. PS solution) is applied as an optical waveguide layer thereonto, and the resultant is allowed to stand at 120° C. for 60 minutes to be cured, and subjected to photolithography, followed by reactive ion etching (RIE), to thereby form a Mach-Zehnder optical waveguide. The film thickness of the optical waveguide layer is 3.3 µm, and the ridge height of the optical waveguide is 0.7 µm and the width thereof is 5 µm.

Then, the ultraviolet curable acrylic resin having a refractive index of 1.54 is applied as an upper cladding layer on the thus-formed optical waveguide layer, and irradiated with an ultraviolet ray to be cured in a way similar to that used for forming the lower cladding layer, thereby making an upper cladding layer formed of the cured resin film having a thickness of 3.5 µm.

A resist is applied onto this upper cladding layer to form a pattern of an upper electrode by photolithography, and gold is sputtered thereon, and the resist is lifted off to form an upper electrode.

Thereupon, a rectangular-shaped upper electrode having a thickness of 0.5 µm is formed on each of regions corresponding to two arms of the optical waveguide formed into a Mach-Zehnder optical waveguide, and the upper electrodes are determined as electrode pads that serve as a pair of the upper electrodes 20.

By these processes, the optical waveguide portion 25 is manufactured.

Then, the protective member 22 is manufactured as follows. First, a mask is adhered onto a photosensitive glass (trade name: PEG3, manufactured by HOYA Corporation, thickness 500 µm), and a region in which a throughhole is to be formed (hereinafter, may be referred to as a throughhole region) is irradiated with UV light through the mask to form a latent image corresponding to an exposed part. Thereafter, the resultant is heat-treated at 400° C. to crystallize only the exposed part, dilute hydrofluoric acid (i.e. 10% solution) is sprayed onto front and back surfaces of the photosensitive glass to dissolve and remove the crystallized glass portions at the throughhole region, thereby forming an opening having an opening diameter of 50 µm. Then, an electroconductive film including chromium and copper is formed by a sputtering method and an electric field plating method so as to close the opening on one of the surfaces, to form at once an electroconductive film which serves a conductive portion 23B and a wiring electrode 23C. Further, a wiring pattern is formed by a photolithography method, and the resultant is subjected to etching treatment, thereby forming a wiring pattern in which an electrode pad (20 µm×20 µm, thickness 5 µm) is provided at a desired position.

Then, a protective layer of a metal film of the conductive portion 23B is provided in the opening pore. Further, a resist is coated on a region of this protective member 22 on which the conductive portion has been formed, a pattern of a wiring electrode is formed by photolithography and, gold is sputtered and lifted off, thereby, an electrode pad (100 µm×100 µm, thickness 1 µm) for the wiring electrode 23A is formed. Thereby, the protective member 22 is manufactured, in which an electrode pad as the wiring electrode 23A, the conductive portion 23B, and an electrode pad as wiring electrode 23C are provided.

Then, the thus-formed optical waveguide portion, and the protective member 22 are adhered using an electroconductive paste so that an electrode pad as the wiring electrode 23C and an electrode pad for the upper electrode 20 face each other, to thereby manufacture the optical waveguide element 100.

Then, this optical waveguide element 100 is fixed on a module casing which has been prepared in advance, using a thermosetting adhesive by heating at 150° C. for 30 minutes. Then, this module casing is set on a wire bonder, and heated at 200° C., and the module casing, and an electrode pad as the wiring electrode 23C provided on an upper surface of the protective member 22 are connected by wire bonding, thereby obtaining a module. In a state where a terminal of a voltage application device (i.e. poling device) is connected to the wiring electrode 23C of the optical waveguide element 100 of the obtained module and, at the same time, the lower electrode 12 is grounded, and the optical waveguide element 100 is retained at 140° C., a voltage of 1,000 V is applied between the upper electrode 20 and the lower electrode 12 via the wiring electrode 23C, and this state is maintained for 30 minutes. Thereafter, in a state where the voltage is applied, the temperature is lowered to room temperature (25° C.). By performing a poling treatment as described above, the optical waveguide element 100 is obtained.

Laser light having a wavelength of 1.55 µm at an intensity of 1 mW is introduced from a light introduction side of the resultant optical wavelength via an optical fiber for light inputting and outputting and, at the same time, a triangular wave having a frequency of 10 Hz, a maximum value of +10V, and a minimum value of −10V is applied between one of the two upper electrodes and the lower electrode of this optical waveguide element, to assess the modulation property of the element. As a result, a half-wavelength voltage (Vπ) of the optical waveguide element is found to be 4V, and it is confirmed that the element functions as an optical modulation element module.

The modulation property (i.e. half-wavelength voltage) is assessed as follows. Outgoing light is measured with an optical power meter (trade name: MT9812B+MU931241A, manufactured by Anritsu Company), a modulation property curve is obtained from a relationship of the applied voltage and the outgoing light intensity, and a half-wavelength voltage (Vπ) is obtained from the difference between the maximum light output voltage and the minimum light output voltage.

Comparative Example 1 an optical waveguide element (corresponding to the optical waveguide portion 25 of Example 1) is manufactured in the same manner as in Example 1 except that the protective member is not provided. Thereafter, the optical waveguide element is fixed on a module casing using a thermosetting adhesive by heating at 150° C. for 30 minutes in the same manner as in Example 1. Then, this module casing is set on a wire bonder, and is heated to 200° C., and it is tried to connect the module casing and the upper electrode 20 of the optical waveguide element by wire bonding. However, a hole is formed in the optical waveguide layer 16 owing to the heat and pressure generated by the wire bonding. As a result, the module casing and the upper electrode can not be electrically connected, and a damage is generated in the optical waveguide.

What is claimed is:

1. An optical waveguide element comprising:
    an optical waveguide including an organic non-linear optical material;
    a first electrode arranged on one surface side of the optical waveguide;
    a second electrode arranged on another surface side of the optical waveguide;
    a protective member disposed on the second electrode, the protective member including (i) a third electrode which is provided on a first surface of the protective member, the first surface facing the second electrode, the third electrode being electrically connected to the second electrode, (ii) a fourth electrode which is provided on a second surface of the protective member, the second surface opposing the first surface, and (iii) a conductive portion which penetrates through the protective member from the first surface to the second surface, and electrically connects the third electrode and the fourth electrode.

2. The optical waveguide element of claim 1, further comprising:
    a first cladding layer provided between the first electrode and the optical waveguide; and
    a second cladding layer provided between the second electrode and the optical waveguide.

3. The optical waveguide element of claim 1, wherein the optical waveguide is a Mach-Zehnder optical waveguide.

4. The optical waveguide element of claim 1, wherein the optical waveguide is a multimode interference optical waveguide.

5. The optical waveguide element of claim 1, wherein the optical waveguide has a structure projecting towards the first electrode side or the second electrode side.

6. The optical waveguide element of claim 1, wherein the optical waveguide has a structure projecting towards both of the first electrode side and the second electrode side.

7. The optical waveguide element of claim 1, wherein
    the organic non-linear material is at least one of an organic non-linear optical polymer in which an organic compound having a non-linear optical property is added to a polymer matrix; a main chain organic non-linear optical polymer in which a structure having a non-linear optical property is introduced into a main chain of a polymer; or a side chain organic non-linear optical polymer in which a structure having a non-linear optical property is introduced into a side chain of a polymer, and wherein
    the structure having a non-linear optical property is a chromophore structure.

8. The optical waveguide element of claim 7, wherein the chromophore structure is represented by the following structural formula (1):

$$D\text{-}P\text{-}A \qquad \text{Structural Formula (1)}$$

wherein D represents an atomic group having an electron donating property, P represents a binding site, and A represents an electron withdrawing property.

9. The optical waveguide element of claim 8, wherein D represents at least one of an aliphatic unsaturated bond having an electron donating substituent, an aromatic ring having an electron donating substituent, or a heteroaromatic ring having an electron donating substituent, or a combination thereof 10. The optical waveguide element of claim 8, wherein the A represents at least one of an aliphatic unsaturated bond in which an electron withdrawing substituent is introduced, an aromatic ring in which an electron withdrawing substituent is introduced, or a heteroaromatic ring in which an electron withdrawing substituent is introduced, or a combination thereof.

11. The optical waveguide element of claim 1, wherein a thickness of the optical waveguide is about 5.0 μm or less.

12. The optical waveguide element of claim 5, wherein a height of the projecting structure of the optical waveguide is from about 50 nm to about 3,000 nm, and a width of the structure is from about 1 μm to about 15 μm.

13. The optical waveguide element of claim 6, wherein a height of the projecting structure of the optical waveguide is from about 50 nm to about 3,000 nm, and a width of the structure is from about 1 μm to about 15 μm.

14. The optical waveguide element of claim 2, wherein each of the first cladding layer and the second cladding layer comprises a polymer material.

* * * * *